(12) United States Patent
Mueller

(10) Patent No.: US 6,761,035 B1
(45) Date of Patent: Jul. 13, 2004

(54) THERMALLY FREE FUEL NOZZLE

(75) Inventor: Peter W. Mueller, Morrow, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/418,716

(22) Filed: Oct. 15, 1999

(51) Int. Cl.[7] .............................. F02C 7/20; F02C 7/22
(52) U.S. Cl. ............................ 60/800; 60/740; 60/748; 239/397.5
(58) Field of Search ............................. 60/39.32, 740, 60/742, 748, 739, 800; 239/400, 402, 403, 404, 424.5, 397.5; 431/186, 189, 209

(56) References Cited

U.S. PATENT DOCUMENTS

| 3,013,731 | A | * | 12/1961 | Carlisle | 239/403 |
| 4,070,826 | A | * | 1/1978 | Stenger et al. | 239/425 |
| 4,082,499 | A | * | 4/1978 | Rossi | 431/189 |
| 4,258,544 | A | * | 3/1981 | Gebhart et al. | 60/39.32 |
| 4,409,791 | A | * | 10/1983 | Jourdain et al. | 60/39.32 |
| 4,441,323 | A | * | 4/1984 | Colley | 60/39.32 |
| 4,938,418 | A | * | 7/1990 | Halvorsen | 239/390 |
| 5,146,741 | A | * | 9/1992 | Sood | 60/740 |
| 5,261,240 | A | * | 11/1993 | Oyler et al. | 60/734 |
| 5,490,378 | A | * | 2/1996 | Berger et al. | 60/748 |
| 5,570,580 | A | * | 11/1996 | Mains | 60/742 |
| 5,598,696 | A | * | 2/1997 | Stotts | 60/39.32 |

* cited by examiner

*Primary Examiner*—Ted Kim
(74) *Attorney, Agent, or Firm*—William Scott Andes; Pierce Atwood

(57) ABSTRACT

A fuel nozzle for a gas turbine engine includes a fuel tube enclosed by a housing. The fuel tube and housing are connected by a movable joint including a tubular seat formed on the housing and a boss formed on the fuel tube so as to be disposed within the tubular seat. The boss includes a contact surface that is in sliding engagement with the tubular seat and is rotatable about an axis that is perpendicular to the seat's longitudinal axis. The fuel nozzle further includes a fixed joint that connects the housing to the same section of the fuel tube as the movable joint.

36 Claims, 4 Drawing Sheets

THERMALLY FREE FUEL NOZZLE

BACKGROUND OF THE INVENTION

This invention relates generally to gas turbine engines and more particularly to a fuel nozzle for supplying fuel to the combustor of such engines.

A gas turbine engine includes a compressor that provides pressurized air to a combustor wherein the air is mixed with fuel and ignited for generating hot combustion gases. These gases flow downstream to one or more turbines that extract energy therefrom to power the compressor and provide useful work such as powering an aircraft in flight. In combustors used with aircraft engines, the fuel is typically supplied to the combustor through a fuel nozzle positioned at one end of the combustion zone, and air is supplied through a surrounding assembly, known as a swirler, which imparts a swirling motion to the air so as to cause the air and fuel to be thoroughly mixed.

Because the fuel nozzle is located in the compressor discharge gas stream, it is exposed to relatively high temperatures. The presence of high temperatures around the fuel nozzle can cause the fuel passing through an inner passageway of the fuel nozzle to form granules of carbon on the walls of the inner passageway. The carbon or coke formation on the walls of the inner passageway may cause the fuel nozzle to become clogged. Excessive temperatures can also cause the fuel in the fuel nozzle to gum up, thereby further causing the fuel nozzle to become clogged. In addition, if the fuel becomes overheated, it may begin to vaporize in the inner passageway, thereby resulting in intermittent or non-continuous fuel delivery to the combustor.

Consequently, conventional fuel nozzles typically include a heat shield in the form of a tubular housing that surrounds a fuel tube so as to define an annular air gap therebetween. The air gap serves as a thermal barrier to protect the fuel in the fuel tube against coking. The fuel nozzle is bent at about 90 degrees at a point between its two ends to permit its installation into the combustor.

During engine operation, the temperature of the housing is greater than the temperature of the fuel tube resulting in differential thermal expansion. The housing is mounted to the fuel tube in conventional fuel nozzles by a fixed joint at one end of the fuel tube for dynamic stability and a sliding joint at the other end of the fuel tube, opposite the bend, to accommodate the thermal expansion differential. The sliding joint typically includes an O-ring boss on the end of the fuel tube that slides inside a seat formed on the housing.

Because the fuel nozzle is located in the compressor discharge gas stream, the thermal expansion differential is most acute during engine acceleration, such as at take off. The housing quickly outgrows the fuel tube, resulting in the O-ring boss being pulled toward the end of the seat. Conversely during engine deceleration, the housing cools (and hence shrinks) more quickly than the fuel tube, causing the O-ring boss to be pushed back farther into the seat. However, because of the bend in the fuel nozzle, a portion of the nozzle lies at a 90 degree angle with the longitudinal axis of the seat. Relative thermal expansion in this offset portion forces the O-ring boss out of axial alignment with the seat (i.e., they are no longer co-axial). As the housing shrinks and tries to push the O-ring boss back into the seat, it cannot because the O-ring boss binds within the seat due to the misalignment caused by the offset. This binding causes high compressive stress, yielding and foreshortening of the fuel tube. As repeated cycles of acceleration and deceleration continue to foreshorten the fuel tube through this "thermal ratcheting" mechanism, the boss can become fully extracted from the seat.

The resulting fuel leakage into the air gap, coking and indeterminate dynamic behavior of the unseated fuel tube can eventually result in fuel nozzle failure.

Accordingly, there is a need for a fuel nozzle that is capable of withstanding high compressor discharge temperatures while avoiding the thermally induced binding and stress problems of prior nozzles.

SUMMARY OF THE INVENTION

The above-mentioned needs are met by the present invention which provides a fuel nozzle having a fuel tube enclosed by a housing. The fuel tube and housing are connected by a movable joint including a tubular seat formed on the housing and a boss formed on the fuel tube so as to be disposed within the tubular seat. The boss includes a contact surface that is in sliding engagement with the tubular seat and is rotatable about an axis that is perpendicular to the seat's longitudinal axis. The fuel nozzle further includes a fixed joint that connects the housing to the same section of the fuel tube as the movable joint.

The present invention and its advantages over the prior art will become apparent upon reading the following detailed description and the appended claims with reference to the accompanying drawings.

DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
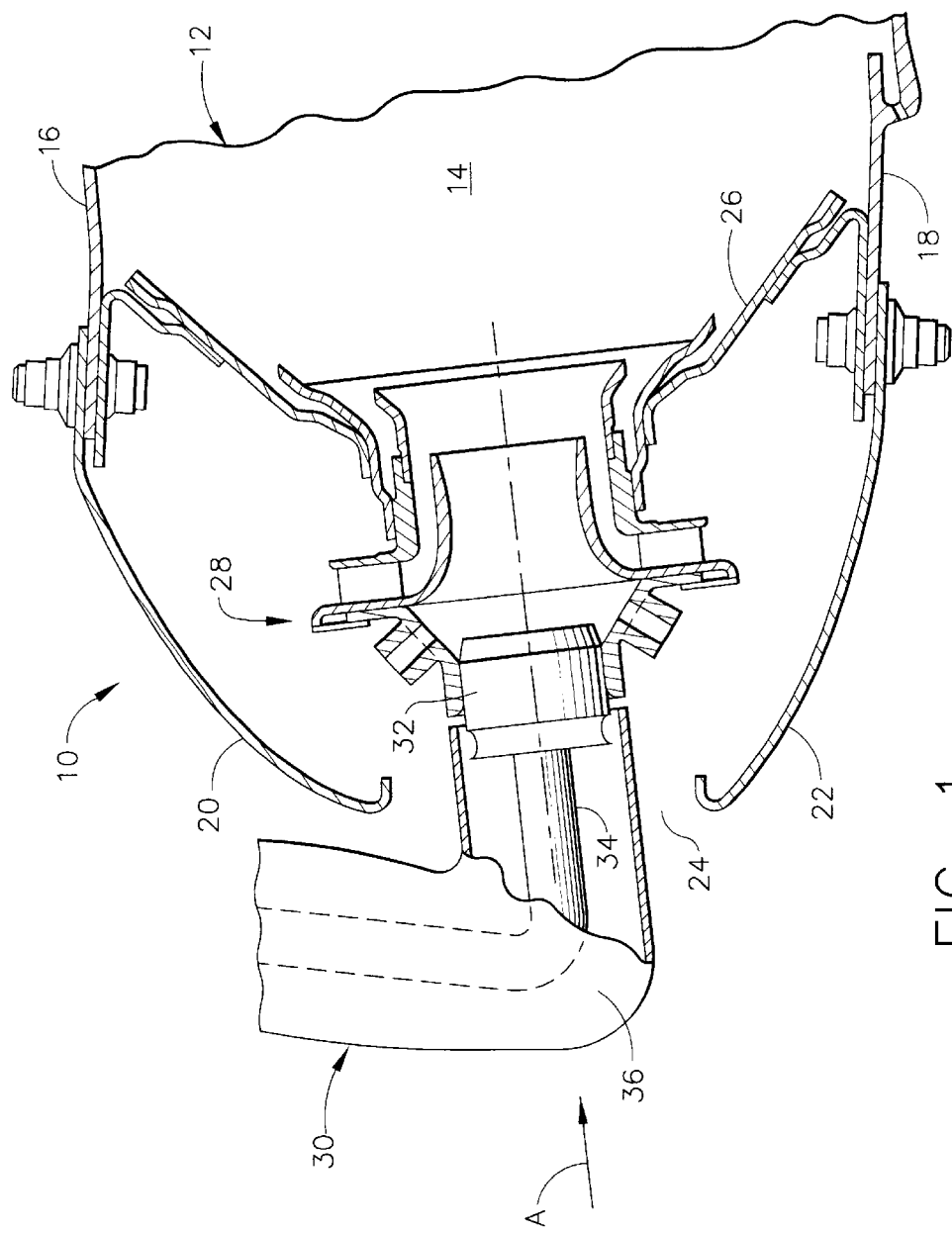
FIG. 1 is an axial sectional view of the forward portion of a combustor having the fuel nozzle of the present invention.

Referring to the drawings wherein identical reference numerals denote the same elements throughout the various views, FIG. 1 shows the forward end of a combustor 10 of the type suitable for use in a gas turbine engine and including a hollow body 12 defining a combustion chamber 14 therein. The hollow body 12 is generally annular in form and is defined by an outer liner 16 and an inner liner 18. The upstream end of the hollow body 12 is substantially closed off by an outer cowl 20 attached to the outer liner 16 and an inner cowl 22 attached to the inner liner 18. An annular opening 24 is formed by the outer and inner cowls 20 and 22 for the introduction of fuel and compressed air. The compressed air is introduced into the combustor 10 from a compressor (not shown) in a direction generally indicated by arrow A of FIG. 1. The compressed air passes primarily through the opening 24 to support combustion and partially into the region surrounding the hollow body 12 where it is used to cool both the liners 16 and 18 and turbomachinery further downstream.

Disposed between and interconnecting the outer and inner liners 16 and 18 near their upstream ends is an annular dome plate 26. A plurality of circumferentially spaced swirler assemblies 28 (one shown in FIG. 1) is mounted in the dome plate 26. Each swirler assembly 28 has a central opening that coaxially receives a corresponding fuel nozzle 30. Each fuel nozzle 30 includes a fuel tip 32 disposed in the central opening and a fuel tube 34 enclosed by a housing 36. Fuel is carried through the fuel tube 34 to the fuel tip 32 and discharge therefrom. The swirler assemblies 28 swirl the air received via the annular opening 24. The swirling air interacts with fuel
discharged from the fuel nozzle 30 so that a thoroughly mixed fuel/air mixture flows into the combustion chamber 14.

Figure 2:
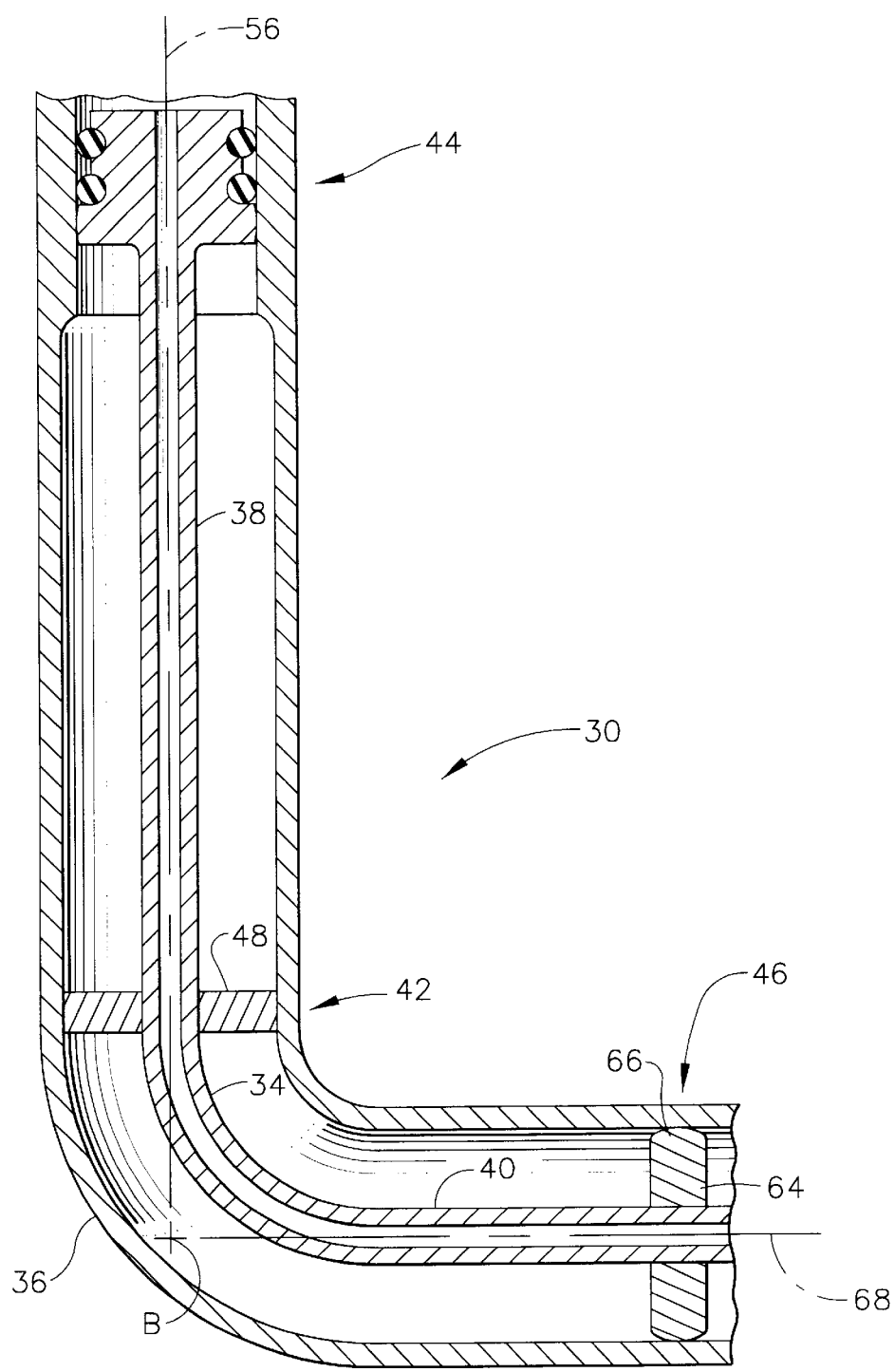
FIG. 2 is a sectional view of the fuel nozzle of FIG. 1.

Turning now to FIG. 2, the fuel nozzle 30 of the present invention is shown in more detail. The fuel tube 34, which carries fuel to the swirler assemblies 28, has an approximately 90 degree bend formed therein at a location intermediate its two ends so as to define a first linear section 38 and a second linear section 40 on opposite sides of the bend. The second linear section 40 is preferably much shorter than the first linear section 38. The housing 36 is a substantially tubular structure that is also bent to permit it to surround the bent fuel tube 34. The bent configuration of the fuel nozzle 30 facilitates its installation into the combustor 10; wherein, the first linear section 38 is arranged substantially radially with respect to the flow path of the combustor 10, and the second linear section 40 is arranged substantially axially with respect to the flow path of the combustor 10. The inner radius of the housing 36 is significantly larger than the outer radius of the fuel tube 34 so as to define an annular air gap between the fuel tube 34 and the housing 36. The housing 36 and the air gap thus serve to protect the fuel tube 34 from the high temperatures to which the fuel nozzle 30 is exposed.

The housing 36 and the first linear section 38 of the fuel tube 34 are connected by a fixed joint 42, which is located adjacent to the bend formed in the fuel tube 34, and a first movable joint 44, which is located at a first end of the fuel tube 34. The housing 36 and the second linear section 40 of the fuel tube 34 are connected by a second movable joint 46 located near a second end of the fuel tube 34. As will be described more fully below, the joints 44 and 46 are referred to as "movable" joints because they permit relative sliding and rotation of the associated elements.

The fixed joint 42 includes an annular plate 48 that snugly fits between the fuel tube 34 and the housing 36. The plate 48 is fixedly secured to both the fuel tube 34 and the housing 36 by any suitable means such as brazing. As is well known, the plate 48 can include a bellows section so as to readily permit radial expansion and contraction.

Figure 3:
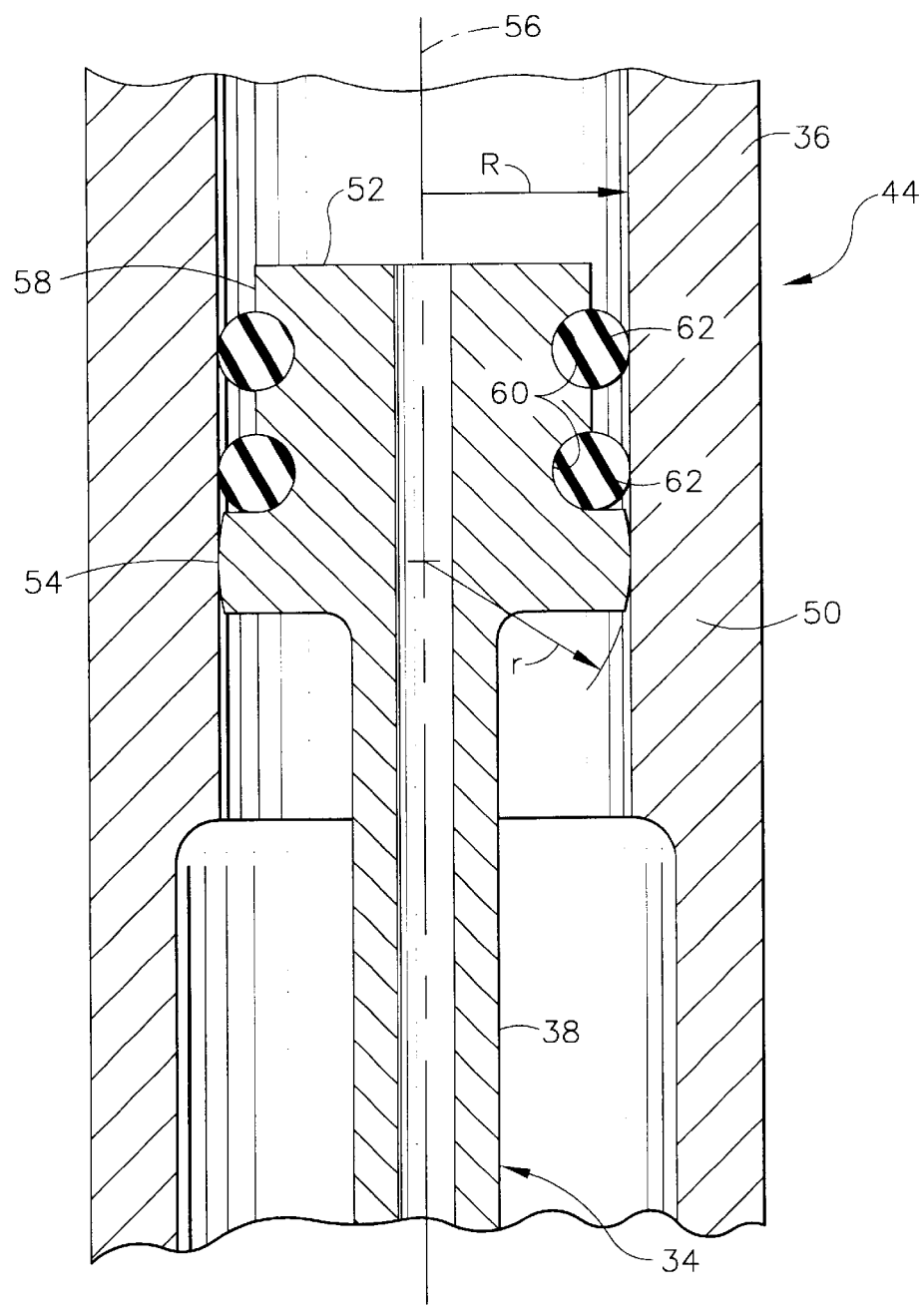
FIG. 3 is an enlarged view of a portion of the fuel nozzle of FIG. 1.

Referring to FIG. 3, the first movable joint 44 is shown in detail. The movable joint 44 includes a tubular seat 50 formed on the inside surface of the housing 36 and a boss 52 formed on the first end of the fuel tube 34 and disposed within the tubular seat 50. The tubular seat 50 defines an inner cylindrical surface having a radius, R, that is slightly less than the inner radius of the rest of housing 36. The boss 52 has a contact surface 54 that is in sliding and rotational engagement with the tubular seat 50. The contact surface 54 is a crowned or spherical surface that is centered about a point located on the longitudinal axis 56 of the first linear section 38 of the fuel tube 34. The spherical contact surface 54 defines a radius, r, which is equal to the inside radius R of the tubular seat 50.

The boss 52 also includes a cylindrical surface 58 that is centered about the longitudinal axis 56 and adjoins the contact surface 54. The cylindrical surface 58 defines a radius that is less than the radius r of the contact surface 54. This reduced radius means that only surface 54 will contact the tubular seat 50. Two recesses 60 are formed in the cylindrical surface 58. Each recess 60 has an O-ring 62 disposed therein for sealing the air gap between the fuel tube 34 and the housing 36. The O-rings 62 contact the inner surface of the tubular seat 50 to prevent fuel leakage into the air gap.

Referring again to FIG. 2, it is seen that the second movable joint 46 includes an annular plate 64 that snugly fits between the second linear section 40 of the fuel tube 34 and the housing 36. The inner surface of the plate 64 is fixedly secured near a second end of the fuel tube 34 by any suitable means such as brazing, and the plate 64 defines an outer contact surface 66 that is in sliding and rotational engagement with the inner surface of the housing 36. The contact surface 66 is a crowned or spherical surface that is centered about a point located on the longitudinal axis 68 of the second linear section 40 of the fuel tube 34. The spherical contact surface 66 defines a radius that is equal to the inside radius of the housing 36.

Preferably, all moving surfaces of each movable joint 44 and 46 are wear protected. This can be accomplished by providing each such surface (i.e., the inner surface of the tubular seat 50, the contact surface 54 of the boss 52, the contact surface 66 of the plate 64, and the inner surface of the housing 36) with a suitable wear resistant coating. One preferred coating material would be chrome carbide.

During operation, the fuel nozzle 30 of the present invention is able to accommodate differential thermal growth of the fuel tube 34 and the housing 36 without the boss 52 binding in the tubular seat 50 and without the fuel tube 34 experiencing large stresses. Because of the arrangement of the fixed joint 42 and the first movable joint 44, the first linear section 38 of the fuel tube 34 is able to expand and contract (relative to the housing 36) freely along its longitudinal axis 56 between the first end and the fixed joint 42. And, because of the second movable joint 46, the second linear section 40 is free to expand and contract (relative to the housing 36) along its longitudinal axis 68. This substantially eliminates any tendency for the first linear section 38 to be forced out of axial alignment with the tubular seat 50 due to relative thermal expansion in the second linear section 40. Accordingly, the inherent offset deflection of conventional fuel nozzles is eliminated such that binding of the boss 52 in the tubular seat 50 is avoided.

The contact surface 54 further assures that the boss 52 will not bind inside of the tubular seat 50 from dimensional or thermal stack-ups not related to misalignment. In addition to sliding within the tubular seat 50, the boss 52 is free to rotate without binding within the tubular seat 50 about a radial axis (i.e., an axis perpendicular to the longitudinal axis 56) because of the spherical shape of the contact surface 54. Similarly, the spherical contact surface 66 allows the plate 64 of the second movable joint 46 to rotate without binding within the housing 36 about a radial axis (i.e., an axis perpendicular to the longitudinal axis 68).

Furthermore, the placement of the fixed joint 42 relative to the first and second movable joints 44 and 46 greatly reduces thermally induced stresses in the fuel tube 34.

Stresses are eliminated in the first linear section 38 of the fuel tube 34, between the first end and the fixed joint 42, because of the first movable joint 44, and stresses are eliminated in the second linear section 40, between point B (which is the intersection of the two longitudinal axes 56 and 68) and the second end of the fuel tube 34, because of the second movable joint 46. Stresses are generated due to thermal growth only in the short length of the first linear section 38 between point B and the fixed joint 42. However, moment stresses at the second movable joint 46 due to thermal growth in the first linear section 38 between point B and the fixed joint 42 are eliminated because of the capability of the cylindrical surface 66 of the plate 64 to rotate within the housing 36.

Figure 4:
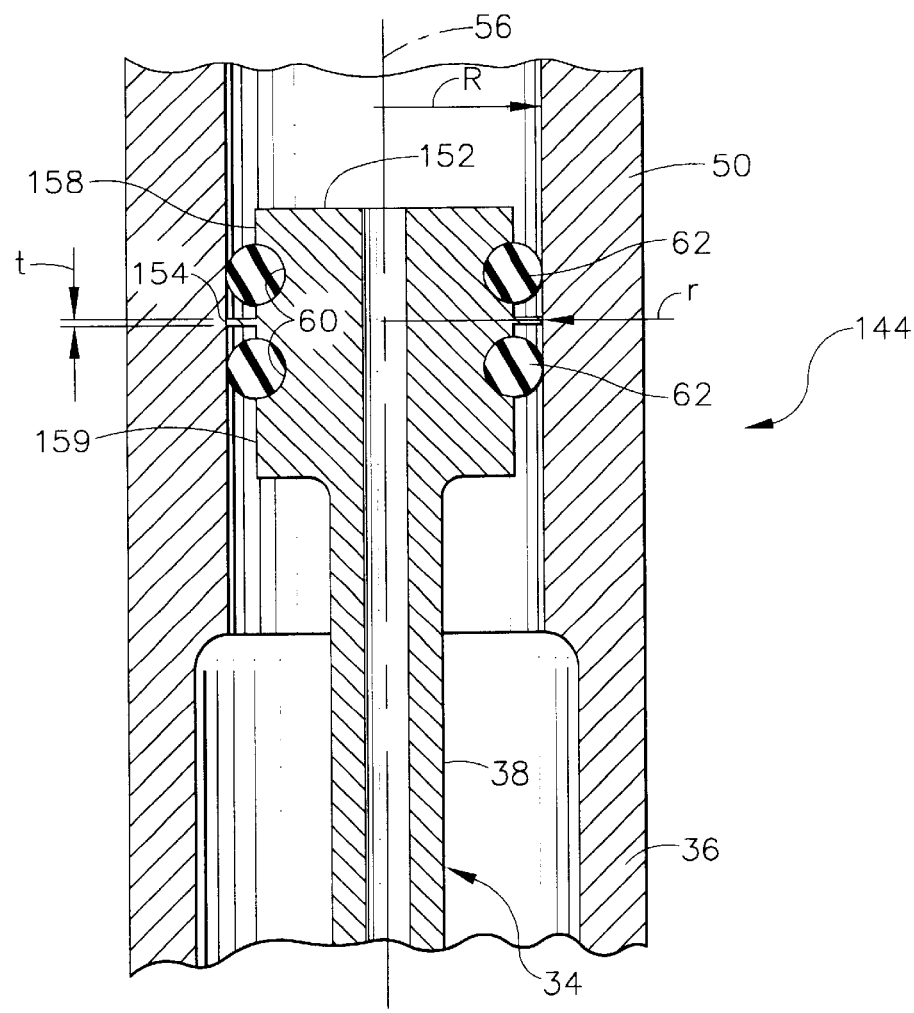
FIG. 4 is a fragmentary, cut-away view of a portion of a fuel nozzle showing an alternative embodiment of the present invention.

FIG. 4 shows an alternative embodiment of a first movable joint 144 between the first linear section 38 of the fuel tube 34 and the housing 36. In this embodiment, the first movable joint 144 includes the tubular seat 50 formed on the inside surface of the housing 36 and a boss 152 formed on the first end of the fuel tube 34 and disposed within the tubular seat 50. The tubular seat 50 defines an inner cylindrical surface having a radius, R, that is slightly less than the inner radius of the rest of housing 36. The boss 152 has a contact surface 154 that is in sliding and rotational engagement with the tubular seat 50. The contact surface 154 is a cylindrical surface that is centered about the longitudinal axis 56 of the first linear section 38 of the fuel tube 34 and defines a radius, r, that is equal to the inside radius R of the tubular seat 50.

The boss 152 also includes two secondary cylindrical surfaces 158 and 159 that are centered about the longitudinal axis 56 and adjoin the contact surface 154 on opposite sides thereof. The cylindrical surfaces 158 and 159 each define a radius that is less than the radius r of the contact surface 154. This reduced radius means that only surface 154 will contact the tubular seat 50. A recess 60 is formed in each cylindrical surface 158 and 159. Each recess 60 has an O-ring 62 disposed therein for sealing the air gap between the fuel tube 34 and the housing 36. The O-rings 62 contact the inner surface of the tubular seat 50 to prevent fuel leakage into the air gap.

The cylindrical contact surface 154 is provided with a dimension, t, in the axial direction that is very small compared to the inside radius of the tubular seat 50. Typically, the dimension t is no larger than 70 mils. Because of its very small axial dimension, the contact surface 154 approximates line contact with the inner surface of the tubular seat 50, and the boss 152 is able to rotate without binding within the tubular seat 50 about a radial axis (i.e., an axis perpendicular to the longitudinal axis 56). As in the first embodiment, the inner surface of the tubular seat 50 and the contact surface 154 are wear protected with a suitable wear resistant coating.

Figure 5:
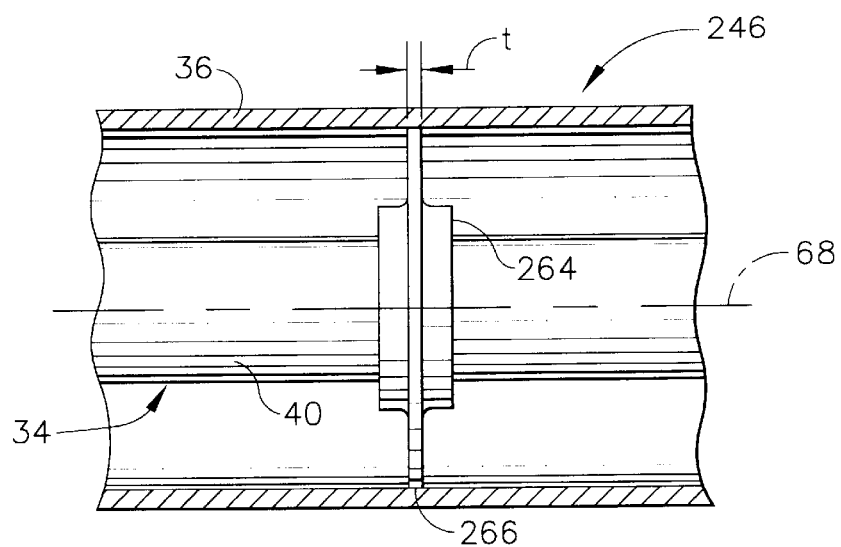
FIG. 5 is a fragmentary, cut-away view of a portion of a fuel nozzle showing another alternative embodiment of the present invention.

FIG. 5 shows an alternative embodiment of a second movable joint 246 between the second linear section 40 of the fuel tube 34 and the housing 36. In this embodiment, the second movable joint 246 includes an annular plate 264 that snugly fits between the second linear section 40 of the fuel tube 34 and the housing 36. The inner surface of the annular plate 264 is fixedly secured near the second end of the fuel tube 34 by any suitable means such as brazing, and the annular plate 264 has an outer contact surface 266 that is in sliding engagement with the inner surface of the housing 36.

The contact surface 266 is a cylindrical surface that is centered about the longitudinal axis 68 of the second linear section 40 and defines a radius (with respect to the longitudinal axis 68) that is equal to the inside radius of the housing 36. The contact surface 266 is provided with a dimension, t, in the axial direction that is very small compared to the inside radius of the housing 36. Preferably, the dimension t is no larger than 70 mils. Because of its very small axial dimension, the contact surface 266 approximates line contact with the inner surface of the housing 36, and the annular plate 264 is able to rotate without binding within the housing 36 about a radial axis (i.e., an axis perpendicular to the longitudinal axis 68). As in the first embodiment, the inner surface of the housing 36 and the contact surface 266 are wear protected with a suitable wear resistant coating.

The foregoing has described a fuel nozzle that avoids thermally induced binding and stress problems. While specific embodiments of the present invention have been described, it will be apparent to those skilled in the art that various modifications thereto can be made without departing from the spirit and scope of the invention as defined in the appended claims.

What is claimed is:

1. A fuel nozzle comprising:
   a fuel tube;
   a fuel tip attached to one end of said fuel tube;
   a housing disposed around said fuel tube so as to define an air gap therebetween; and
   a movable joint between said housing and said fuel tube, said movable joint comprising a tubular seat formed on said housing and defining a longitudinal axis, and a boss formed on said fuel tube so as to be disposed within said tubular seat, said boss including a contact surface that is in sliding engagement with said tubular seat and is rotatable about an axis that is perpendicular to said longitudinal axis.

2. The fuel nozzle of claim 1 wherein said boss is formed on said fuel tube at one end thereof.

3. The fuel nozzle of claim 1 wherein said tubular seat has an inside radius and said contact surface is a spherical surface having a radius that is equal to said inside radius of said tubular seat.

4. The fuel nozzle of claim 3 wherein said boss includes a cylindrical surface having a lesser radius than said contact surface.

5. The fuel nozzle of claim 4 further comprising at least one recess formed in said cylindrical surface and an O-ring disposed in said recess.

6. The fuel nozzle of claim 1 wherein said contact surface is a cylindrical surface having a small axial dimension.

7. The fuel nozzle of claim 6 wherein said boss includes a secondary cylindrical surface on each side of said contact surface, each secondary cylindrical surface having a lesser radius than said contact surface.

8. The fuel nozzle of claim 7 further comprising a recess formed in each one of said secondary cylindrical surfaces and an O-ring disposed in each recess.

9. A fuel nozzle comprising:
   a fuel tube having a first end and a second end, said fuel tube having a bend formed therein so as to define first and second sections on opposite sides of said bend;
   a housing disposed around said fuel tube so as to enclose said fuel tube including said bend;
   a fixed joint between said housing and said first section of said fuel tube; and
   a movable joint between said housing and said first section of said fuel tube that permits relative sliding and rotation between said housing and said fuel tube.

10. The fuel nozzle of claim 9 wherein said fixed joint is located adjacent to said bend and said movable joint is located adjacent to said first end of said fuel tube.

11. The fuel nozzle of claim 9 wherein said movable joint comprises:
   a tubular seat formed on said housing and defining a longitudinal axis; and
   a boss formed on said fuel tube so as to be disposed within said tubular seat, said boss including a contact surface that is in sliding engagement with said tubular seat and is rotatable about an axis that is perpendicular to said longitudinal axis.

12. The fuel nozzle of claim 11 wherein said boss is formed on said first end of said fuel tube.

13. The fuel nozzle of claim 11 wherein said tubular seat has an inside radius and said contact surface is a spherical surface having a radius that is equal to said inside radius of said tubular seat.

14. The fuel nozzle of claim 13 wherein said boss includes a cylindrical surface having a lesser radius than said contact surface.

15. The fuel nozzle of claim 14 further comprising at least one recess formed in said cylindrical surface and an O-ring disposed in said recess.

16. The fuel nozzle of claim 11 wherein said contact surface is a cylindrical surface having a small axial dimension.

17. The fuel nozzle of claim 16 wherein said boss includes a secondary cylindrical surface on each side of said contact surface, each secondary cylindrical surface having a lesser radius than said contact surface.

18. The fuel nozzle of claim 17 further comprising a recess formed in each one of said secondary cylindrical surfaces and an O-ring disposed in each recess.

19. The fuel nozzle of claim 9 wherein said fixed joint comprises a plate fixed to said fuel tube and said housing.

20. The fuel nozzle of claim 9 further comprising a second movable joint between said housing and said second section of said fuel tube.

21. The fuel nozzle of claim 20 wherein said second movable joint comprises a plate fixed to said fuel tube, said plate including a contact surface that is in sliding engagement with said housing.

22. The fuel nozzle of claim 21 wherein said plate is fixed to said fuel tube near said second end thereof.

23. The fuel nozzle of claim 22 wherein said housing defines an inside radius and said contact surface is a spherical surface having a radius that is equal to said inside radius of said housing.

24. The fuel nozzle of claim 22 wherein said contact surface is a cylindrical surface having a small axial dimension that permits said plate to rotate within said housing about a radial axis.

25. A fuel nozzle comprising:
   a fuel tube having a first end and a second end, said fuel tube having a bend formed therein at a location intermediate said first and second ends;
   a housing disposed around said fuel tube so as to enclose said fuel tube including said bend and to define an air gap therebetween;
   a first movable joint between said fuel tube and said housing at said first end of said fuel tube;
   a second movable joint between said second end of said fuel tube and said housing; and
   a fixed joint between said fuel tube and said housing located between said bend and said first end of said fuel tube, adjacent to said bend.

26. The fuel nozzle of claim 25 wherein said first movable joint comprises:
   a tubular seat formed on said housing and defining a longitudinal axis; and
   a boss formed on said first end of said fuel tube so as to be disposed within said tubular seat, said boss including a contact surface that is in sliding engagement with said tubular seat and is rotatable about an axis that is perpendicular to said longitudinal axis.

27. The fuel nozzle of claim 26 wherein said tubular seat has an inside radius and said contact surface is a spherical surface having a radius that is equal to said inside radius of said tubular seat.

28. The fuel nozzle of claim 27 wherein said boss includes a cylindrical surface having a lesser radius than said contact surface.

29. The fuel nozzle of claim 28 further comprising at least one recess formed in said cylindrical surface and an O-ring disposed in said recess.

30. The fuel nozzle of claim 26 wherein said contact surface is a cylindrical surface having a small axial dimension.

31. The fuel nozzle of claim 30 wherein said boss includes a secondary cylindrical surface on each side of said contact surface, each secondary cylindrical surface having a lesser radius than said contact surface.

32. The fuel nozzle of claim 31 further comprising a recess formed in each one of said secondary cylindrical surfaces and an O-ring disposed in each recess.

33. The fuel nozzle of claim 25 wherein said fixed joint comprises a plate fixed to said fuel tube and said housing.

34. The fuel nozzle of claim 25 wherein said second movable joint comprises a plate fixed to said fuel tube near said second end thereof, said plate including a contact surface that is in sliding engagement with said housing.

35. The fuel nozzle of claim 34 wherein said housing defines an inside radius and said contact surface is a spherical surface having a radius that is equal to said inside radius of said housing.

36. The fuel nozzle of claim 34 wherein said contact surface is a cylindrical surface having a small axial dimension that permits said plate to rotate within said housing about a radial axis.

* * * * *